United States Patent
Nagai

(10) Patent No.: US 9,391,353 B2
(45) Date of Patent: *Jul. 12, 2016

(54) RESONANCE COUPLER

(71) Applicant: Panasonic Intellectual Property Management Co., Ltd., Osaka (JP)

(72) Inventor: Shuichi Nagai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/245,224

(22) Filed: Apr. 4, 2014

(65) Prior Publication Data

US 2014/0218136 A1 Aug. 7, 2014

Related U.S. Application Data

(63) Continuation of application No. 14/063,399, filed on Oct. 25, 2013, now Pat. No. 8,729,983, which is a continuation of application No. PCT/JP2012/006493, filed on Oct. 10, 2012.

(30) Foreign Application Priority Data

Nov. 1, 2011 (JP) .................. 2011-240665

(51) Int. Cl.
*H01P 5/12* (2006.01)
*H01P 5/02* (2006.01)
(Continued)

(52) U.S. Cl.
CPC ............ *H01P 5/028* (2013.01); *H01P 1/20381* (2013.01); *H01P 5/187* (2013.01); *H04B 5/00* (2013.01)

(58) Field of Classification Search
CPC ............. H01P 7/00; H01P 7/08; H01P 7/082; H01P 5/12
USPC ........... 333/219, 219.1, 202, 204, 24 C, 24 R; 310/320
See application file for complete search history.

(56) References Cited

U.S. PATENT DOCUMENTS 4,469,976 A * 9/1984 Scott ...................... G10K 11/32
310/334
4,939,403 A 7/1990 Kittaka et al.
(Continued)

FOREIGN PATENT DOCUMENTS

CN 101325427 A 12/2008
JP 6-204719 7/1994
(Continued)

OTHER PUBLICATIONS

Office Action with Search Report issued Feb. 10, 2015 in corresponding Chinese Application No. 201280010610.9 (with English translation of Search Report).

(Continued)

*Primary Examiner* — Dean Takaoka
(74) *Attorney, Agent, or Firm* — Wenderoth, Lind & Ponack, L.L.P.

(57) ABSTRACT

A resonance coupler includes transmission-side resonant wiring provided on a transmission substrate and connected to a transmission ground between a connection point of first transmission wiring to the transmission-side resonant wiring and a connection point of second transmission wiring to the transmission-side resonant wiring, and reception-side resonant wiring provided on a reception substrate and connected to a reception ground between a connection point of first reception wiring to the reception-side resonant wiring and a connection point of second reception wiring to reception-side resonant wiring. When viewed in a direction perpendicular to a main surface of the transmission substrate, the transmission substrate and the reception substrate are provided facing each other so that the transmission-side resonant wiring and the reception-side resonant wiring are symmetric about a point and have matching contours.

13 Claims, 9 Drawing Sheets

(51) Int. Cl.
*H01P 7/08* (2006.01)
*H01P 1/203* (2006.01)
*H01P 5/18* (2006.01)
*H04B 5/00* (2006.01)

(56) References Cited

U.S. PATENT DOCUMENTS

| | | | |
|---|---|---|---|
| 5,045,744 A | 9/1991 | Ando et al. | |
| 5,629,266 A * | 5/1997 | Lithgow | H01P 1/20 333/202 |
| 5,917,386 A * | 6/1999 | Dobrovolny | H01F 17/0006 333/119 |
| 6,686,812 B2 | 2/2004 | Gilbert et al. | |
| 7,515,021 B2 | 4/2009 | Kalinin et al. | |
| 7,692,444 B2 | 4/2010 | Chen et al. | |
| 8,432,235 B2 | 4/2013 | Yoshioka et al. | |
| 8,552,821 B2 | 10/2013 | Nagai | |
| 8,706,029 B2 | 4/2014 | Washiro | |
| 8,723,626 B2 * | 5/2014 | Nagai et al. | 333/219 |
| 8,729,983 B2 * | 5/2014 | Nagai | 333/219 |
| 2003/0218516 A1 | 11/2003 | Gilbert et al. | |
| 2008/0061910 A1 | 3/2008 | Kalinin et al. | |
| 2008/0311849 A1 | 12/2008 | Washiro | |
| 2011/0043305 A1 | 2/2011 | Yoshioka et al. | |
| 2014/0049338 A1 * | 2/2014 | Nagai et al. | 333/120 |
| 2014/0049345 A1 * | 2/2014 | Nagai | 333/24 R |
| 2014/0203888 A1 * | 7/2014 | Nagai et al. | 333/117 |
| 2014/0218136 A1 * | 8/2014 | Nagai | 333/219 |
| 2016/0072167 A1 * | 3/2016 | Kawai | H01P 5/02 333/24 R |

FOREIGN PATENT DOCUMENTS

| | | |
|---|---|---|
| JP | 9-55608 | 2/1997 |
| JP | 2005-527167 | 9/2005 |
| JP | 2008-67012 | 3/2008 |
| JP | 2008-507158 | 3/2008 |
| JP | 2008-219081 | 9/2008 |
| JP | 2011-045008 | 3/2011 |
| WO | 03/100904 | 12/2003 |
| WO | 2005/104292 | 11/2005 |
| WO | 2011/040392 | 4/2011 |

OTHER PUBLICATIONS

International Search Report issued Jan. 8, 2013 in corresponding International Application No. PCT/JP2012/006493.

André Kurs et al. "Wireless Power Transfer via Strongly Coupled Magnetic Resonances", Science Express, vol. 317, No. 5834, Jul. 6, 2007, pp. 83-86.

\* cited by examiner

RESONANCE COUPLER

CROSS REFERENCE TO RELATED APPLICATIONS

This is a continuation of application Ser. No. 14/063,399, filed Oct. 25, 2013, which is a continuation application of PCT International Application No. PCT/JP2012/006493 filed on Oct. 10, 2012, designating the United States of America, which is based on and claims priority of Japanese Patent Application No. 2011-240665 filed on Nov. 1, 2011. The entire disclosures of the above-identified applications, including the specifications, drawings and claims are incorporated herein by reference in their entirety.

FIELD

One or more exemplary embodiments disclosed herein relate generally to resonance couplers used for wireless signal transmission or wireless energy transmission.

BACKGROUND

Wireless transmission technology is a known technology for transmitting signals or energy between electrical devices not directly connected by wiring.

In the transmission and reception of signals between high frequency semiconductor chips and external devices, uncertain parasitic capacitance or parasitic inductance occurs when transmission lines are provided using wiring bonding, which affects the characteristics of the high frequency signal. Wireless transmission technology, which does not negatively affect the characteristics of high frequency signals, is used for this reason.

The electronic circuit element known as a digital isolator is one example of a known wireless transmission apparatus which uses wireless transmission technology (for example, see Patent Literature (PTL) 1). The technology disclosed in PTL 1 allows for the ground for logic signals and the ground for RF signals to be isolated, and as such, is widely applicable.

This kind of wireless transmission apparatus is used as, for example, a gate driving element, such as an insulated gate bipolar transistor (IGBT), which is a power electronics semiconductor switching device. More specifically, this kind of wireless transmission apparatus is used in inverter systems or matrix converter systems, which convert DC electricity to AC electricity of a given frequency.

With this kind of power semiconductor switching device, due to fluctuation in source potential with reference to high voltage, it is necessary to insulate the DC component between within the gate driving element and the power semiconductor switching device. For this reason, in this kind of power semiconductor switching device, a wireless transmission apparatus capable of ground isolation is used to drive the gate.

Moreover, electromagnetic resonance couplers (also known as electromagnetic field resonance couplers) which employ the coupling of two electric wiring resonators are one example of wireless transmission technology that has gained attention in recent years. (for example, see PTL 2, Non-Patent Literature (NPL) 1). These electromagnetic resonance couplers are characterized by an ability to efficiently transmit signals across a great distance.

CITATION LIST

Patent Literature

[PTL 1] U.S. Pat. No. 7,692,444
[PTL 2] Japanese Unexamined Patent Application Publication No. 2008-067012

Non Patent Literature

[NPL 1] Andre Kurs, et al.: "Wireless Power Transfer via Strongly Coupled Magnetic Resonances", Science Express, Vol. 317, No. 5834, pp. 83-86 (2007)

SUMMARY

Technical Problem

When an electromagnetic resonance coupler is to be used as the above-described gate driving element, a wireless transmission apparatus provided with a plurality of electromagnetic resonance couplers is required. However, compared to the transistors of a semiconductor integrated circuit, the electromagnetic resonance coupler is substantially large. As such, high integration and miniaturization of the wireless transmission apparatus is problematic.

One non-limiting and exemplary embodiment disclosed herein provides an electromagnetic resonance coupler which allows for the miniaturization and high integration of the wireless transmission apparatus.

Solution to Problem

In order to overcome the aforementioned problem, a resonance coupler according to an aspect of an exemplary embodiment is a resonance coupler for wireless transmission of a transmission signal, the resonance coupler including: a first planar region; a second planar region facing the first planar region; a first transmission line; and a second transmission line, wherein the first transmission line includes: first resonant wiring; first input wiring connected to the first resonant wiring; and second input wiring connected to the first resonant wiring, the first input wiring and the second input wiring are wiring to which the transmission signal is inputted, the second transmission line includes: second resonant wiring; first output wiring connected to the second resonant wiring; and second output wiring connected to the second resonant wiring, the first output wiring and the second output wiring are wiring from which the transmission signal is outputted, a first grounding point on the first resonant wiring is connected to first ground wiring indicating a reference potential of the transmission signal in the first transmission line, the first grounding point is positioned between a connection point of the first input wiring to the first resonant wiring and a connection point of the second input wiring to the first resonant wiring, a second grounding point on the second resonant wiring is connected to second ground wiring indicating a reference potential of the transmission signal in the second transmission line, and the second grounding point is positioned between a connection point of the first output wiring to the second resonant wiring and a connection point of the second output wiring to the second resonant wiring.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A miniaturized and highly integrated wireless transmission apparatus using a plurality of resonance couplers is achievable by implementing the resonance coupler according to one or more exemplary embodiments or features disclosed herein.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS (Underlying Knowledge Forming Basis of the Present Disclosure)

As disclosed in the Background section, electromagnetic resonance couplers which employ the coupling of two electric wiring resonators are one example of known wireless transmission technology.

Figure 1:
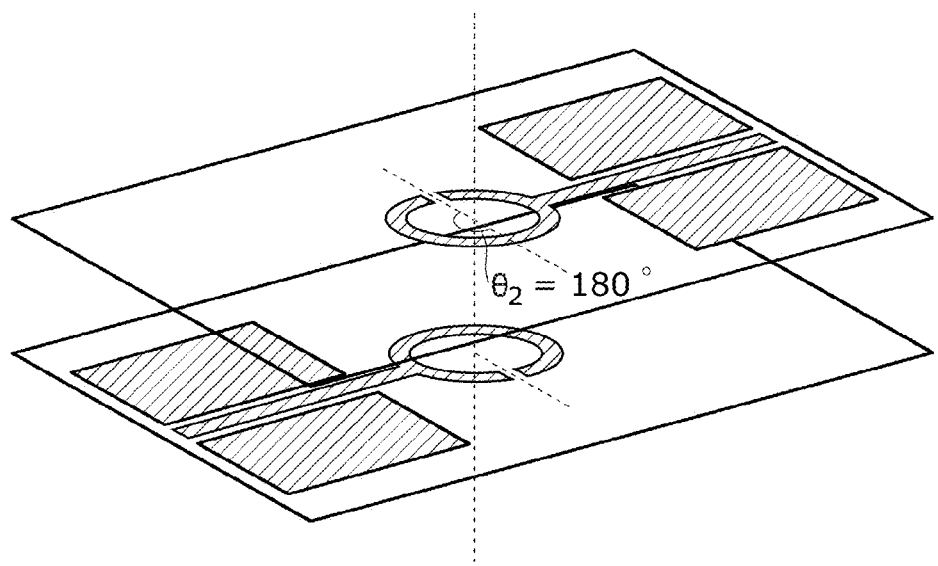
FIG. 1 is a schematic view of the electromagnetic resonance coupler disclosed in PTL 2.

Among these electromagnetic resonance couplers, although the structure is simplistic, miniaturization is possible with an open ring type electromagnetic resonance coupler such as the one shown in FIG. 1, and wireless transmission is accomplishable in a small space.

Moreover, this sort of open ring type electromagnetic resonance coupler is known to have favorable transmission characteristics.

Figure 2:
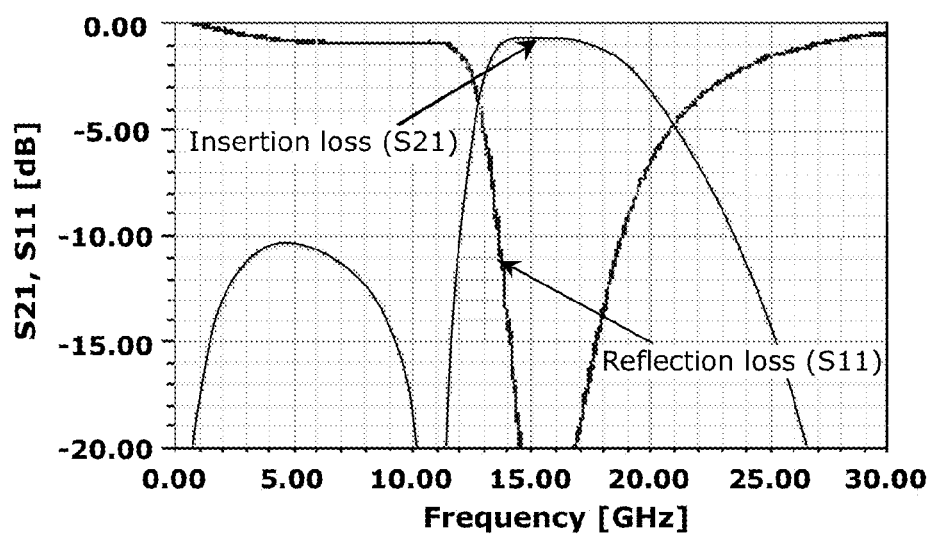
FIG. 2 shows the transmission characteristics of the electromagnetic resonance coupler disclosed in PTL 2.

FIG. 2 shows the transmission characteristics of the open ring type electromagnetic resonance coupler disclosed in PTL 2.

In FIG. 2, S21 shows the insertion loss of the open ring type electromagnetic resonance coupler, and shows that an electric signal whose frequency is in the vicinity of 15 GHz can be efficiently transmitted with approximately 1 dB of insertion loss.

The frequency (operating frequency) of the signal capable of being transmitted by an open ring type electromagnetic resonance coupler such as the one shown in FIG. 1 is, to be exact, determined by the inductance and capacitance of the ring shaped resonant wiring in the electromagnetic resonance coupler. However, the operating frequency can be approximately calculated from the effective area of the ring shaped wiring and the dielectric constant of the substrate on which the ring shaped wiring is formed.

[Math 1]

$$fr = \frac{1}{2\pi\sqrt{LC}} \approx \frac{c}{2\pi a \sqrt{\varepsilon_r}} \quad \text{(Equation 1)}$$

In Equation 1, c represents light speed, and $\varepsilon_r$ represents the relative dielectric constant of the substrate (dielectric). Moreover, a represents the effective area of the ring shaped wiring, which is approximately the diameter of the ring.

For example, when a frequency in the vicinity of 15 GHz is transmitted in the open ring type electromagnetic resonance coupler, the diameter of the ring shaped wiring is approximately 1 mm. Moreover, when the diameter of the open ring type electromagnetic resonance coupler is doubled with Equation 1, the operating frequency is halved to 7.5 GHz.

In other words, compared to the transistors and such in the semiconductor integrated circuit, the open ring type electromagnetic resonance coupler is substantially large in size.

Here, when an electromagnetic resonance coupler is used as a gate driving element in an inverter system or the like described in the Background section, since a wireless transmission apparatus provided with a plurality of electromagnetic resonance couplers is required, miniaturization and high integration of the wireless transmission apparatus is problematic.

In order to overcome the aforementioned problem, an resonance coupler according to an aspect of an exemplary embodiment is a resonance coupler for wireless transmission of a high frequency signal between a first transmission line and a second transmission line, the resonance coupler comprising: the first transmission line including, on a first plane, first resonant wiring having an open loop shape having an opening, first input/output wiring connected to the first resonant wiring, and second input/output wiring connected to the first resonant wiring; and the second transmission line including, on a second plane facing the first plane, second resonant wiring, third input/output wiring connected to the second resonant wiring, and fourth input/output wiring connected to the second resonant wiring, the second resonant wiring having a same wiring width and shape as a wiring width and shape of the first resonant wiring, wherein a first grounding point provided on the first resonant wiring is connected to first ground wiring indicating a reference potential of the high frequency signal in the first transmission line, the first grounding point provided between a connection point of the first input/output wiring to the first resonant wiring and a connection point of the second input/output wiring to the first resonant wiring, a second grounding point provided on the second resonant wiring is connected to second ground wiring indicating a reference potential of the high frequency signal in the second transmission line, the second grounding point provided between a connection point of the third input/output wiring to the second resonant wiring and a connection point of the fourth input/output wiring to the second resonant wiring, and the first transmission line and the second transmission line are provided facing each other and, when viewed in a direction perpendicular to the first plane, the first resonant wiring and the second resonant wiring have matching contours and are symmetric about a point.

With this, it is possible to isolate and accomplish the wireless transmission of two high frequency signals with one resonance coupler. As such, in a wireless transmission apparatus which uses a plurality of resonance couplers, the number of resonance couplers used is reduced in half, and miniaturization and high integration of the apparatus is possible.

Moreover, according to one non-limiting and exemplary embodiment, the first transmission line may be provided on a first surface of a first substrate, and the second transmission line may be provided on a first surface of a second substrate.

Moreover, according to one non-limiting and exemplary embodiment, the first ground wiring may be provided either on a second surface of the first substrate or on a substrate provided facing the first substrate, the first grounding point may be connected to the first ground wiring by a first via hole, the second ground wiring may be provided either on a second surface of the second substrate or on a substrate provided facing the second substrate, and the second grounding point may be connected to the second ground wiring by a second via hole.

Moreover, according to one non-limiting and exemplary embodiment, the first grounding point may be connected to the first via hole by wiring, and the second grounding point may be connected to the second via hole by wiring.

With this, it is possible to reduce interference between the two high frequency signals transmitted by the resonance coupler and secure isolation.

Moreover, according to one non-limiting and exemplary embodiment, the first via hole may be provided inside the loop shape of the first resonant wiring, and the second via hole may be provided inside the loop shape of the second resonant wiring.

With this, it is possible to decrease the area taken up by the wiring and via on the substrate since the via hole is provided inside of the loop shaped resonant wiring. As such, miniaturization of the resonance coupler is possible.

Moreover, according to one non-limiting and exemplary embodiment, the first ground wiring may be provided on the first surface of the first substrate at a periphery of the first resonant wiring, the first input/output wiring, and the second input/output wiring, and the second ground wiring may be provided on the first surface of the second substrate at a periphery of the second resonant wiring, the third input/output wiring, and the fourth input/output wiring.

With this, since a via hole is not required, reduction in size of the resonance coupler in the thickness direction of the substrate can be realized.

Moreover, since the transmission line of the resonance coupler assumes a coplanar wiring structure and a ground is provided at a periphery of the resonance coupler, the transmission efficiency of the electromagnetic resonance coupler improves, and unwanted radiation noise is suppressed.

Moreover, according to one non-limiting and exemplary embodiment, the first input/output wiring may be connected to the first resonant wiring at a position three-eighths of a wiring length of the first resonant wiring away from a first end of the first resonant wiring, the second input/output wiring may be connected to the first resonant wiring at a position five-eighths of the wiring length of the first resonant wiring away from the first end of the first resonant wiring, the third input/output wiring may be connected to the second resonant wiring at a position three-eighths of a wiring length of the second resonant wiring away from a first end of the second resonant wiring, and the fourth input/output wiring may be connected to the second resonant wiring at a position five-eighths of the wiring length of the second resonant wiring away from the first end of the second resonant wiring. Additionally, according to one non-limiting and exemplary embodiment, the first grounding point may be positioned one half of a wiring length of the first resonant wiring away from a first end of the first resonant wiring, and the second grounding point may be positioned one half of a wiring length of the second resonant wiring away from a first end of the second resonant wiring. Further, according to one non-limiting and exemplary embodiment, the first transmission line and the second transmission line may be provided facing each other and spaced apart by a distance of at most a half wavelength of the high frequency signal, the distance being measured in a direction perpendicular to the first plane and measured between the first resonant wiring and the second resonant wiring.

With this, loss of field emission and such is reduced, and it is possible to transmit signals with a high transmission rate.

Moreover, according to one non-limiting and exemplary embodiment, the loop shape may have a circular contour.

Moreover, according to one non-limiting and exemplary embodiment, the loop shape may have a rectangular contour.

Moreover, according to one non-limiting and exemplary embodiment, the loop shape may be a shape having at least five bends.

In this way, it is possible to further miniaturize the resonance coupler since the area taken up by the resonant wiring in the resonance coupler can be reduced by the provision of multiple bends. As such, it is possible to realize a significantly miniaturized wireless transmission apparatus.

According to one non-limiting and exemplary embodiment, a resonance coupler may be a resonance coupler for wireless transmission of a high frequency signal between a first transmission line and a second transmission line, the resonance coupler comprising: the first transmission line including, on a first plane, first resonant wiring having an open loop shape having an opening and a first input/output wiring group of n wires connected to the first resonant wiring, where n is an integer no less than three; and the second transmission line including, on a second plane facing the first plane, second resonant wiring and a second input/output wiring group of n wires connected to the second resonant wiring, the second resonant wiring having a same wiring width and shape a wiring width and shape of the first resonant wiring, wherein n−1 grounding points provided on the first resonant wiring are connected to first ground wiring indicating a reference potential of the high frequency signal in the first transmission line, the n−1 grounding points each provided between a connection point of a wire in the first input/output wiring group to the first resonant wiring and a connection point of a neighboring wire in the first input/output wiring group to the first resonant wiring, n−1 positioned grounding points provided on the second resonant wiring are connected to second ground wiring indicating a reference potential of the high frequency signal in the second transmission line, the n−1 grounding points each provided between a connection point of a wire in the second input/output wiring group to the second resonant wiring and a connection point of a neighboring wire in the second input/output wiring group to the second resonant wiring, and the first transmission line and the second transmission line are provided facing each other and, when viewed in a direction perpendicular to the first plane, the first resonant wiring and the second resonant wiring have matching contours and are symmetric about a point.

With this, it is possible to isolate and accomplish the wireless transmission of multiple high frequency signals with one resonance coupler. As such, in a wireless transmission apparatus which uses a plurality of resonance couplers, the number of resonance couplers used decreases significantly, and miniaturization and high integration of the apparatus is possible.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

(Embodiment 1)

Hereinafter, Embodiment 1 will be described with reference to the Drawings.

(Structure)

First, the structure of the resonance coupler according to Embodiment 1 will be described.

Figure 3:
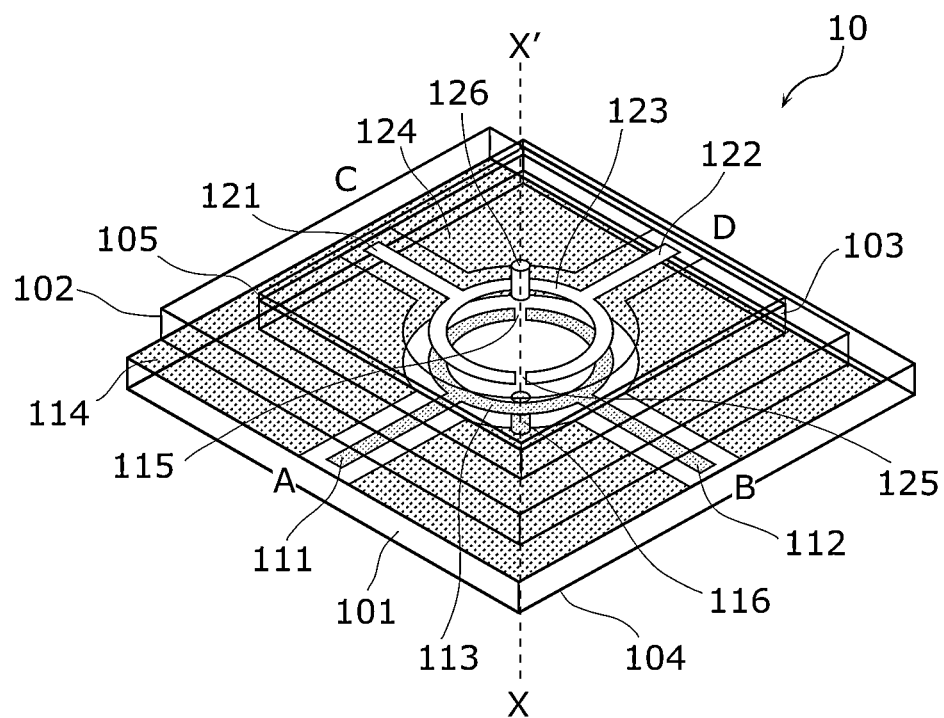
FIG. 3 is a perspective view (transparent view) of the resonance coupler according to Embodiment 1.

FIG. 3 is a perspective view of the resonance coupler according to Embodiment 1.

Figure 4:
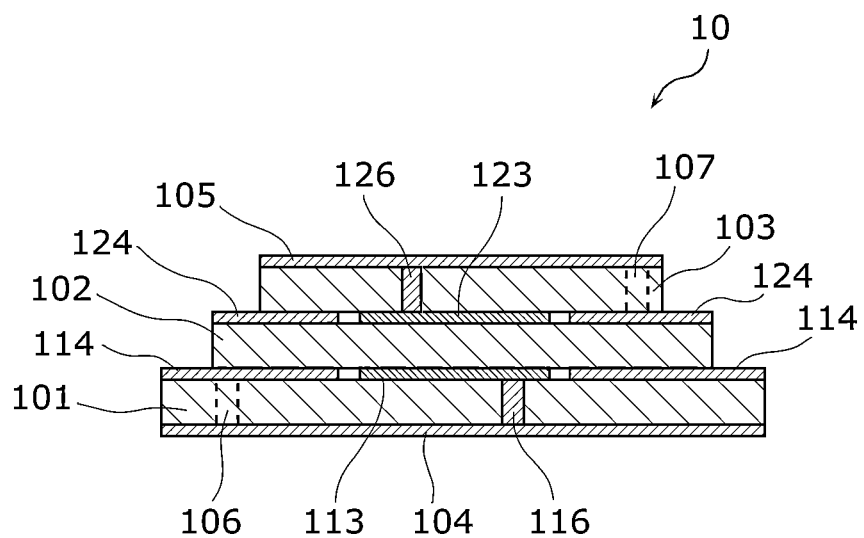
FIG. 4 is a cross sectional view of the resonance coupler according to Embodiment 1.

FIG. 4 is a cross section of the resonance coupler shown in FIG. 3 in a plane passing though a diagonal line of the substrate (a plane perpendicular to the main surface of the substrate and passing through the line X-X' shown in FIG. 3).

The resonance coupler 10 according to Embodiment 1 is a resonance coupler which transmits 18 GHz AC signals. Moreover, the resonance coupler 10 is capable of transmitting two signals with one set of resonant wiring.

The resonance coupler 10 includes a transmission substrate (the first substrate) 101, a reception substrate (the second substrate) 102 provided above the transmission substrate 101, and a cover substrate 103 provided above the reception substrate 102. The transmission substrate 101, the reception substrate 102, and the cover substrate 103 are dielectric substrates, such as sapphire substrates. Moreover, the thickness of each of the substrates is 0.2 mm. It should be noted that gas (such as air), liquid, or other dielectric material may be present between the substrates.

First transmission wiring (the first input wiring) 111 made of metal, second transmission wiring (the second input wiring) 112 made of metal, and transmission-side resonant wiring (the first resonant wiring) 113 made of metal and having a open circular shape (loop shape) opened by a transmission-side slit 115 are formed on the top surface of the transmission substrate 101 (the first planar region). Moreover, a transmission-side coplanar ground 114, which is a metal conductor, is formed at a periphery of the first transmission wiring 111, the second transmission wiring 112, and the transmission-side resonant wiring 113.

The reception substrate 102 overlies the transmission substrate 101 to cover the transmission-side resonant wiring 113 of the transmission substrate 101. First reception wiring (the first output wiring) 121 made of metal, second reception wiring (the second output wiring) 122 made of metal, and reception-side resonant wiring (the second resonant wiring) 123 made of metal and having a open circular shape (loop shape) opened by a reception-side slit 125 are formed on the top surface of the reception substrate 102 (the second planar region). Moreover, a reception-side coplanar ground 124, which is a metal conductor, is formed at a periphery of the first reception wiring 121, the second reception wiring 122, and the reception-side resonant wiring 123.

The cover substrate 103 overlies the transmission substrate 101 to cover the reception-side resonant wiring 123 of the reception substrate 102. Moreover, a cover ground 105, which is a metal conductor, is formed on the top surface of the cover substrate 103.

The material used for the above-described metal wiring and metal conductors is, for example, gold, but may be a different metal. Moreover, a bottom surface ground 104, which is a metal conductor, is formed on the bottom surface of the transmission substrate 101.

A grounding point (the first grounding point) is provided on the transmission-side resonant wiring 113 formed on the top surface of the transmission substrate 101, between a connection point of the transmission-side resonant wiring 113 to the first transmission wiring 111 and a connection point of the transmission-side resonant wiring 113 to the second transmission wiring 112. The grounding point is connected to the bottom surface ground 104 with a transmission-side isolation via 116 that goes through the transmission substrate 101. The transmission-side isolation via 116 is made of a metal conductor and is made of, for example, gold.

Similarly, a grounding point (the second grounding point) is provided on the reception-side resonant wiring 123 formed on the top surface of the reception substrate 102, between a connection point of the reception-side resonant wiring 123 to the first reception wiring 121 and a connection point of the reception-side resonant wiring 123 to the second reception wiring 122. The grounding point is connected to the cover ground 105 with a reception-side isolation via 126 that goes through the cover substrate 103. The reception-side isolation via 126 is made of a metal conductor and is made of, for example, gold.

It should be noted that, as FIG. 4 shows, the bottom surface ground 104 and the transmission-side coplanar ground 114 are connected by a ground via 106 that goes through the transmission substrate 101. The bottom surface ground 104 and the transmission-side coplanar ground 114 are transmission grounds (the first ground wiring) which indicate the reference potential of signals in the transmission substrate 101. The ground via 106 is made of a metal conductor and is made of, for example, gold.

Similarly, as FIG. 4 shows, the cover ground 105 and the reception-side coplanar ground 124 are connected by a ground via 107 that goes through the cover substrate 103. The cover ground 105 and the reception-side coplanar ground 124 are reception grounds (the second ground wiring) which indicate the reference potential of signals in the reception substrate 102. The ground via 107 is made of a metal conductor and is made of, for example, gold.

Next, the transmission substrate 101 and the reception substrate 102 will be discussed in detail.

First, the transmission substrate 101 will be discussed.

Figure 5:
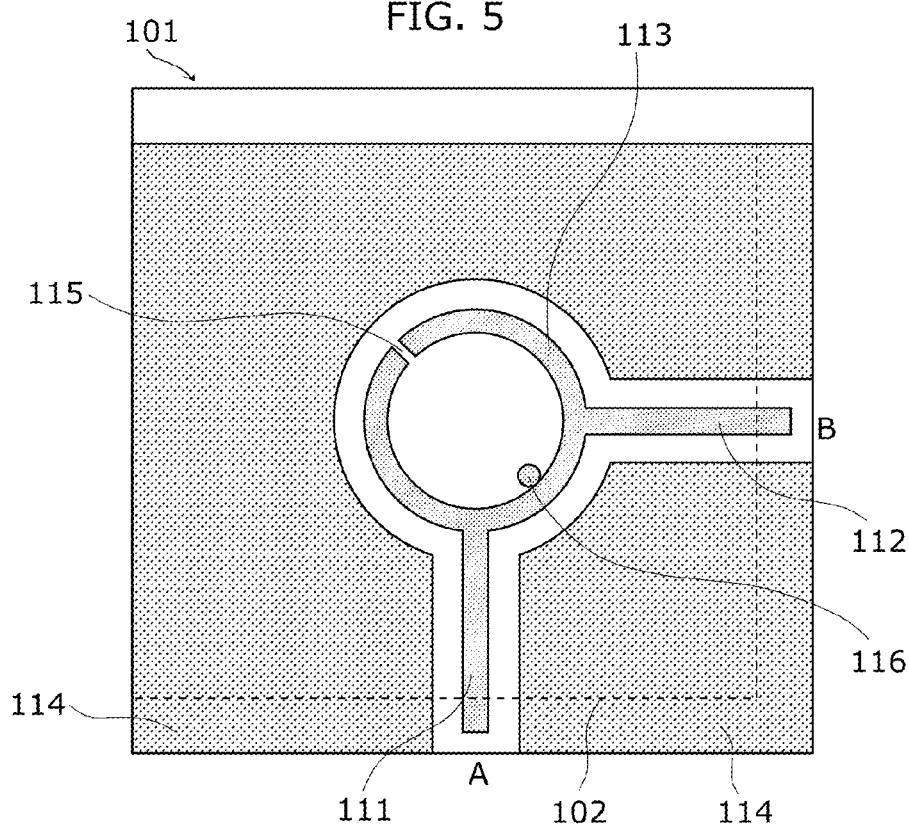
FIG. 5 is a top view of the transmission substrate of the resonance coupler according to Embodiment 1.

FIG. 5 is a top view of the transmission substrate 101.

The transmission-side resonant wiring 113 is circular in shape and has a diameter of 1 mm, and is an open loop shape as a result of a portion of a closed curve being opened by the transmission-side slit 115. The wiring width of the transmission-side resonant wiring 113 is 0.1 mm.

The transmission-side resonant wiring 113 is physically connected to the first transmission wiring 111 and the second transmission wiring 112. More specifically, a first end of the first transmission wiring 111 is connected to the transmission-side resonant wiring 113 at a position three-eighths of the wiring length of the transmission-side resonant wiring 113 away from a first end of the transmission-side resonant wiring 113 created by the transmission-side slit 115. Moreover, a first end of the second transmission wiring 112 is connected to the transmission-side resonant wiring 113 at a position five-eighths of the wiring length of the transmission-side resonant wiring 113 away from the first end of the transmission-side resonant wiring 113 created by the transmission-side slit 115.

The second end of the first transmission wiring 111 not connected to the transmission-side resonant wiring 113 is an input terminal A, and the second end of the second transmission wiring 112 not connected to the transmission-side resonant wiring 113 is an input terminal B. The wiring width of the first transmission wiring 111 and the second transmission wiring 112 alike is 0.1 mm.

The transmission-side resonant wiring 113 is connected to the bottom surface ground 104 with the transmission-side isolation via 116.

More specifically, a first end of the transmission-side isolation via 116 is connected to the transmission-side resonant wiring 113 at a position (the grounding point) one half of the wiring length of the transmission-side resonant wiring 113 away from the first end of the transmission-side resonant wiring 113. Moreover, the transmission-side isolation via 116 is provided on the inside of the loop shape of the transmission-side resonant wiring 113.

In other words, the transmission-side isolation via 116 is connected to the transmission-side resonant wiring 113 at a position between a connection point of the first transmission wiring 111 to the transmission-side resonant wiring 113 and a connection point of the second transmission wiring 112 to the transmission-side resonant wiring 113.

Moreover, the second end of the transmission-side isolation via 116 is connected to the bottom surface ground 104. The transmission-side isolation via 116 has a diameter of 0.1 mm.

The transmission-side coplanar ground 114 is formed at a periphery of the first transmission wiring 111, the second transmission wiring 112, and the transmission-side resonant wiring 113.

Moreover, as the dotted line in FIG. 5 shows, the reception substrate 102 overlies the top surface of transmission substrate 101. The reception substrate 102 is arranged so as to partially cover the input terminals A and B.

Next, the reception substrate 102 will be discussed.

Figure 6:
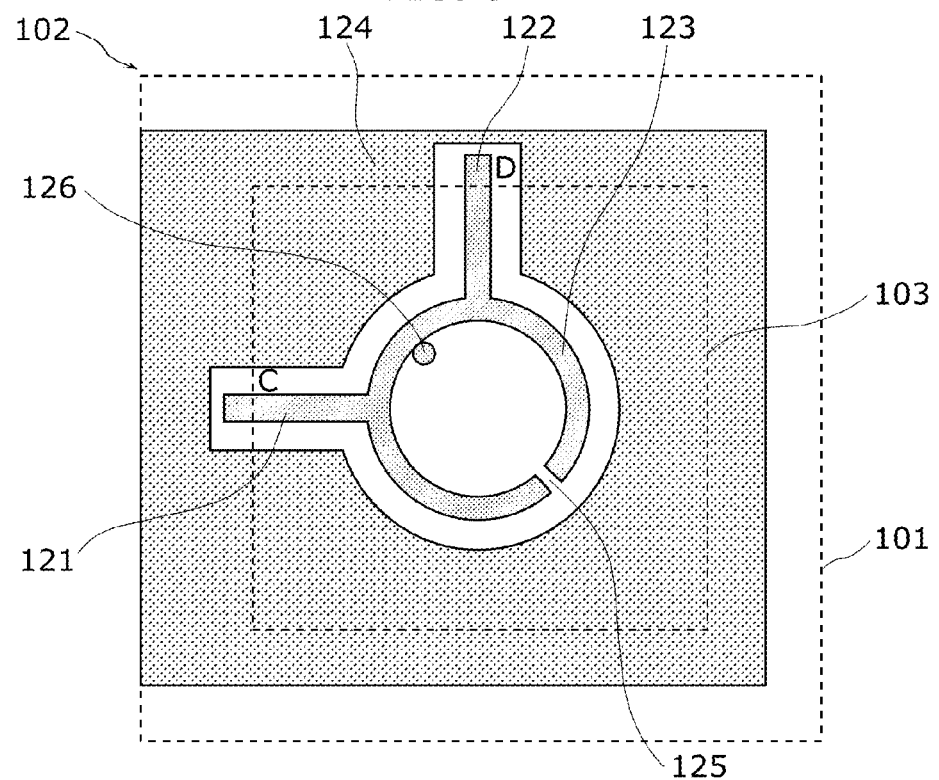
FIG. 6 is a top view of the reception substrate of the resonance coupler according to Embodiment 1.

FIG. 6 is a top view of the reception substrate 102.

The reception-side resonant wiring 123 is circular in shape and has a diameter of 1 mm, and is an open loop shape as a result of a portion of a closed curve being opened by the reception-side slit 125. The wiring width of the reception-side resonant wiring 123 is 0.1 mm.

The reception-side resonant wiring 123 is physically connected to the first reception wiring 121 and the second reception wiring 122. More specifically, the first reception wiring 121 is connected to the reception-side resonant wiring 123 at a position three-eighths of the wiring length of the reception-side resonant wiring 123 away from a first end of the reception-side resonant wiring 123 created by the reception-side slit 125. Moreover, the second reception wiring 122 is connected to the reception-side resonant wiring 123 at a position five-eighths of the wiring length of the reception-side resonant wiring 123 away from the first end of the reception-side resonant wiring 123 created by the reception-side slit 125.

The terminus of the first reception wiring 121 not connected to the reception-side resonant wiring 123 is an output terminal C, and the terminus of the second reception wiring 122 not connected to the reception-side resonant wiring 123 is an output terminal D. The wiring width of the first reception wiring 121 and the second reception wiring 122 alike is 0.1 mm.

The reception-side resonant wiring 123 is connected to the cover ground 105 with the reception-side isolation via 126.

More specifically, a first end of the reception-side isolation via 126 is connected to the reception-side resonant wiring 123 at a position (the grounding point) one half of the wiring length of the reception-side resonant wiring 123 away from the first end of the reception-side resonant wiring 123. Moreover, the reception-side isolation via 126 is provided on the inside of the loop shape of the reception-side resonant wiring 123.

In other words, the reception-side isolation via 126 is connected to the reception-side resonant wiring 123 at a position between a connection point of the first reception wiring 121 to the reception-side resonant wiring 123 and a connection point of the second reception wiring 122 to the reception-side resonant wiring 123.

Moreover, the second end of the reception-side isolation via 126 is connected to the cover ground 105. The reception-side isolation via 126 has a diameter of 0.1 mm.

The reception-side coplanar ground 124 is formed at a periphery of the first reception wiring 121, the second reception wiring 122, and the reception-side resonant wiring 123.

Moreover, as one of the dotted lines in FIG. 6 shows, the cover substrate 103 overlies the top surface of reception substrate 102. The cover substrate 103 is arranged so as to partially cover the output terminals C and D.

As FIG. 5 and FIG. 6 show, when viewed in a direction perpendicular to the main surface of the transmission substrate 101 (hereinafter also referred to as "when viewed from above"), the transmission substrate 101 and the reception substrate 102 overlap (are provided facing each other) so that the contour of the transmission-side resonant wiring 113 and the contour of the reception-side resonant wiring 123 match. Additionally, the transmission substrate 101 and the reception substrate 102 are made to overlap so that the transmission-side resonant wiring 113 and the reception-side resonant wiring 123 are symmetrical about a point when viewed from above.

Here, the contour of the transmission-side resonant wiring 113 (the reception-side resonant wiring 123) is defined as follows. Assuming that the transmission-side slit 115 is not provided in the transmission-side resonant wiring 113 and the transmission-side resonant wiring 113 is wiring having a closed loop shape, this closed loop-shaped wiring includes an inner circumference contour (inner contour) and an outer circumference contour (outer contour). Here, the inner circumference contour defines an area surrounded by the closed loop-shaped wiring, and the outer circumference contour defines the shape of the closed loop-shaped wiring including the inner circumference contour. Of these two contours, the contour of the transmission-side resonant wiring 113 refers to the outer circumference contour of the transmission-side resonant wiring 113. In other words, the transmission-side resonant wiring 113 is defined by the above-described inner circumference contour and the above-described outer circumference contour, and the area occupied by the transmission-side resonant wiring 113 is defined by the outer circumference contour.

Moreover, the transmission-side resonant wiring 113 and the reception-side resonant wiring 123 are spaced at a distance, in a direction perpendicular to the main surface of the transmission substrate 101, of 0.2 mm, which is the substrate thickness of the reception substrate 102. This is no more than one half of the wavelength of the 18 GHz AC signal input to the resonance coupler 10 in Embodiment 1. In other words, the transmission-side resonant wiring 113 and the reception-side resonant wiring 123 are coupled by resonant coupling in a near field. With this, the resonance coupler 10 operates as an electromagnetic resonance coupler.

(Operation)

Next, the operation of the resonance coupler 10 according to Embodiment 1 will be described.

As described above, the transmission-side resonant wiring 113 and the reception-side resonant wiring 123 are coupled by electromagnetic resonant coupling, and resonate at a frequency of approximately 18 GHz. As such, when AC current at a frequency of approximately 18 GHz is generated in the transmission-side resonant wiring 113, AC current at the same frequency is generated in the reception-side resonant wiring 123 as well by electromagnetic resonant coupling.

In other words, AC current at a frequency of approximately 18 GHz is transmitted from the transmission-side resonant wiring 113 to the reception-side resonant wiring 123 wirelessly by electromagnetic resonant coupling. Since it is difficult to radiate unwanted radio waves with near field electromagnetic resonant coupling, radiation noise is substantially small with this kind of wireless transmission.

Furthermore, the resonance coupler 10 includes two input terminals (input terminals A and B) and two output terminals (output terminals C and D), and is capable of isolating and transmitting two signals at the same time. More specifically, by the grounding point of the transmission-side resonant wiring 113 being connected to a transmission ground by the transmission-side isolation via 116 and the grounding point of the reception-side resonant wiring 123 being connected to a reception ground by the reception-side isolation via 126, it is possible to isolate and transmit two AC signals.

Hereinafter, when the transmission-side resonant wiring 113 is separated into two regions based on the grounding point, the region of the transmission-side resonant wiring 113 connected to the first transmission wiring 111 (input terminal A) shall be referred to as wiring region A, and the region connected to the second transmission wiring 112 (input terminal B) shall be referred to as wiring region B.

Similarly, when the reception-side resonant wiring 123 is separated into two regions based on the grounding point, the region of the reception-side resonant wiring 123 connected to the first reception wiring 121 (output terminal C) shall be referred to as wiring region C, and the region connected to the second reception wiring 122 (output terminal D) shall be referred to as wiring region D.

In the resonance coupler 10 shown in FIG. 3, when an 18 GHz AC signal is inputted to input terminal A of transmission substrate 101, the inputted AC signal is transmitted to the transmission-side resonant wiring 113 via the first transmission wiring 111. At this time, since the grounding point of the transmission-side resonant wiring 113 is connected to the transmission ground by the transmission-side isolation via 116, the inputted AC signal is not outputted to input terminal B.

Since the transmission-side resonant wiring 113 and the reception-side resonant wiring 123 are designed to resonate at approximately 18 GHz, the AC signal transmitted to the transmission-side resonant wiring 113 is transmitted to the reception-side resonant wiring 123. At this time, the AC signal generated in the transmission-side resonant wiring 113 is outputted to output terminal C via the first reception wiring 121. This is because output terminal C (the first reception wiring 121) is connected to the wiring region C that overlies the top surface of the wiring region A of the transmission-side resonant wiring 113. Moreover, since the grounding point of the reception-side resonant wiring 123 is connected to the reception ground by the reception-side isolation via 126, the inputted AC signal is not outputted to output terminal D.

Moreover, the 18 GHz AC signal inputted to input terminal B of the transmission substrate 101 is transmitted to the transmission-side resonant wiring 113 via the second transmission wiring 112. At this time, since the grounding point of the transmission-side resonant wiring 113 is connected to the transmission ground by the transmission-side isolation via 116, the inputted AC signal is not outputted to input terminal A.

Since the transmission-side resonant wiring 113 and the reception-side resonant wiring 123 are designed to resonate at approximately 18 GHz, the AC signal transmitted to the transmission-side resonant wiring 113 is transmitted to the reception-side resonant wiring 123. At this time, the AC signal generated in the reception-side resonant wiring 123 is outputted to output terminal D via the second reception wiring 122. This is because output terminal D (the second reception wiring 122) is connected to the wiring region D that overlies the top surface of the wiring region B of the transmission-side resonant wiring 113. Moreover, since the grounding point of the reception-side resonant wiring 123 is connected to the reception ground by the reception-side isolation via 126, the inputted AC signal is not outputted to output terminal C.

Hereinafter, transmission characteristics such as those described above will be discussed with reference to FIG. 7 and FIG. 8, which show data from actual measurements.

Figure 7:
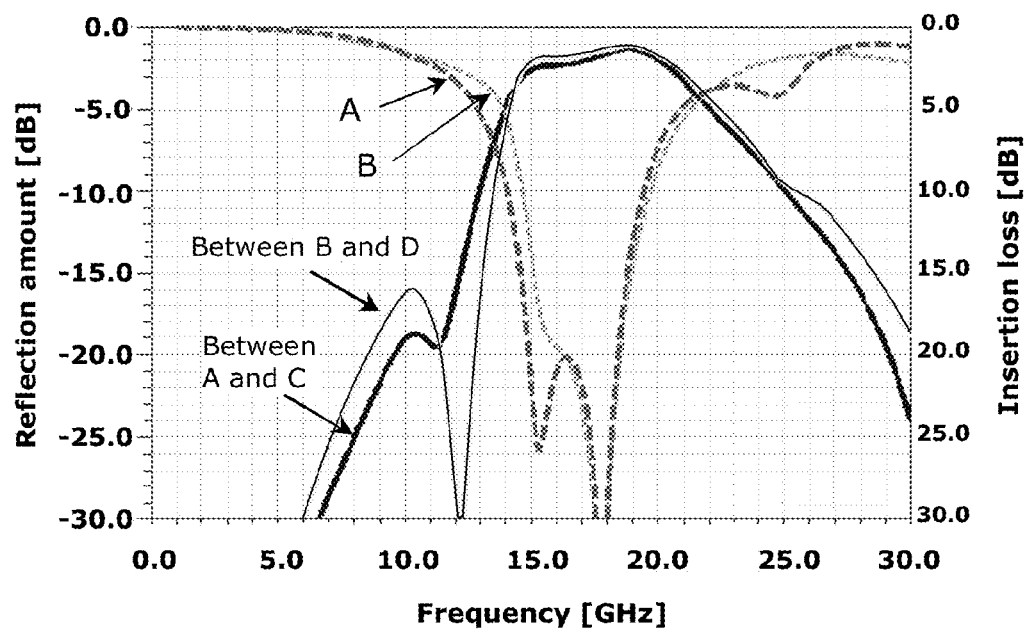
FIG. 7 shows the transmission characteristics of each input/output terminal of the resonance coupler according to Embodiment 1.

FIG. 7 shows the reflection amount of the input signals in the resonance coupler 10 and the insertion loss between input and output signals.

First, the reflection amount will be discussed.

The graph identified by the "A" in FIG. 7 (hereinafter referred to as graph A) indicates reflection amount. The reflection amount, in this case, shows the ratio, shown in decibels (dB), of the electrical energy of an input signal (AC signal) inputted to input terminal A and the electrical energy of a signal reflected off input terminal A (reflected signal). The vertical axis on the left of FIG. 7 indicates reflection amount. Higher values indicate a greater reflection. The horizontal axis indicates the frequency of the input signal.

As FIG. 7 shows, in the case of an input signal at a frequency of approximately 18 GHz, the reflection amount in graph A is −25 dB, meaning the reflection of the input signal is substantially small.

Similarly, the graph identified by the "B" in FIG. 7 (hereinafter referred to as graph B) indicates reflection amount, which shows the ratio, shown in decibels (dB), of the electrical energy of an input signal (AC signal) inputted to input terminal B and the electrical energy of a signal reflected off input terminal B (reflected signal). Similar to graph A, when the input signal is at a frequency of approximately 18 GHz, the reflection amount of the input signal in graph B is substantially small.

Next, insertion loss will be discussed.

The graph identified by "between A and C" in FIG. 7 (hereinafter referred to as graph A-C) indicates insertion loss between input terminal A and output terminal C. Insertion loss, in this case, shows the loss, in decibels (dB), in electrical energy of the signal transmitted from input terminal A to output terminal C, when an input signal is inputted to input terminal A. The vertical axis on the right of FIG. 7 indicates insertion loss. Higher values indicate a greater input signal loss. The horizontal axis indicates the frequency of the input signal.

With graph A-C in FIG. 7, in the frequency band from 15 GHz to 20 GHz, insertion loss is approximately 2 dB, meaning loss is small. In other words, signals at frequencies between 15 GHz and 20 GHz are efficiently transferred from input terminal A to output terminal C.

Similarly, the graph identified by "between B and D" (hereinafter referred to as graph B-D) indicates insertion loss between input terminal B and output terminal D. In this case, insertion loss shows the loss in electrical energy of the signal transmitted from input terminal B to output terminal D, when an input signal is inputted to input terminal B.

With graph B-D in FIG. 7, in the frequency band from 15 GHz to 20 GHz, insertion loss is approximately 2 dB, meaning loss is small. In other words, signals at frequencies between 15 GHz and 20 GHz are efficiently transferred from input terminal B to output terminal D.

Next, signal isolation amount will be discussed.

Figure 8:
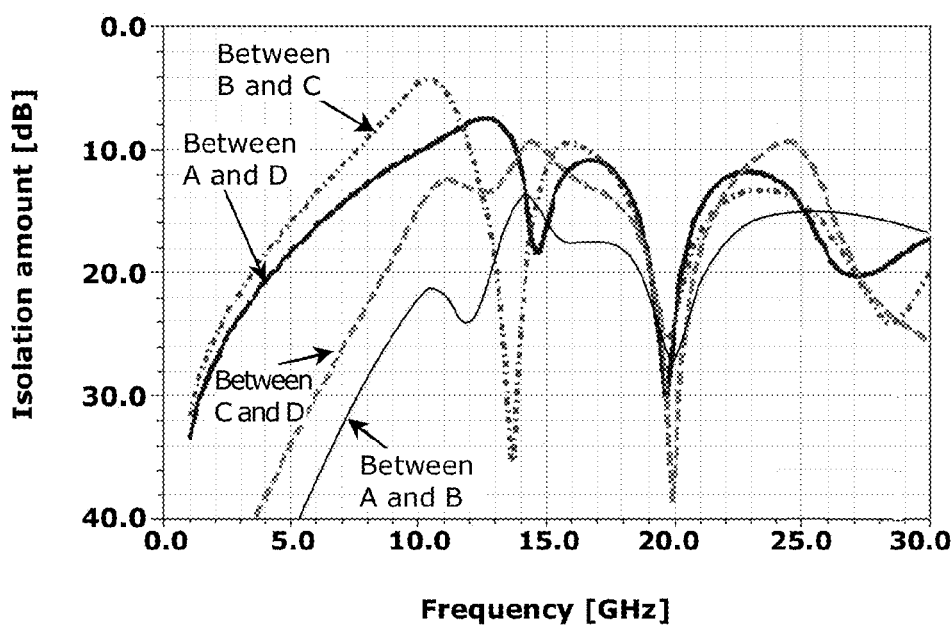
FIG. 8 shows the isolation characteristics of each input/output terminal of the resonance coupler according to Embodiment 1.

FIG. 8 shows the signal isolation amount of the resonance coupler 10.

The graph identified by the "between A and B" in FIG. 8 (hereinafter referred to as graph A-B) indicates isolation amount between input terminal A and input terminal B. Isolation amount, in this case, shows the ratio, in decibels (dB), of the electrical energy of an input signal inputted to input terminal A to the electrical energy of a signal manifesting at input terminal B.

The vertical axis of FIG. 8 indicates isolation amount. Higher values indicate greater isolation. The horizontal axis indicates the frequency of the input signal.

With the graph A-B in FIG. 8, the isolation amount in the frequency band around 18 GHz is no less than 10 dB. In other words, when an input signal at a frequency of approximately 18 GHz is inputted to input terminal A, the impact the signal inputted to input terminal A has on input terminal B is small.

Similarly, the graph identified by "between A and D" in FIG. 8 (hereinafter referred to as graph A-D) indicates isolation amount between input terminal A and output terminal D. Isolation amount, in this case, shows the ratio of the electrical energy of an input signal inputted to input terminal A to the electrical energy of a signal manifesting at output terminal D.

With the graph A-D in FIG. 8, the isolation amount in the frequency band around 18 GHz is no less than 10 dB. In other words, when an input signal at a frequency of approximately 18 GHz is inputted to input terminal A, the impact the signal inputted to input terminal A has on output terminal D is small.

Similarly, the isolation amount between input terminal B and output terminal C, represented as "between B and C" in FIG. 8, in the frequency band around 18 GHz, as well as the isolation amount between output terminal C and output terminal D, represented as "between C and D" in FIG. 8, in the frequency band around 18 GHz is no less than 10 dB. In other words, when an input signal at a frequency of approximately 18 GHz is inputted to input terminal A, the impact the signal inputted to input terminal A has on output terminal D is small.

In this way, in the resonance coupler 10 according to Embodiment 1, in the frequency band used for signal transmission, insertion loss between corresponding input terminals (between input terminal A and output terminal C, and between input terminal B output terminal D) is small.

Moreover, in the above-described frequency band, the influence signals transmitted between input terminals (between input terminal A and input terminal B), between output terminals (between output terminal C and output terminal D), and between non-corresponding input terminals (between input terminal A and output terminal D, and between input terminal B and output terminal C) have on other non-corresponding terminals is small. In other words, signals transmitted between input terminal A and output terminal C and signals transmitted between input terminal B and output terminal D are transmitted isolated from each other.

In this way, since insulation is high between signals, wireless transmission using two paths in one resonance coupler can be accomplished using the resonance coupler 10 according to Embodiment 1 As such, by using the resonance coupler 10, miniaturization and high integration of the wireless transmission apparatus is possible. Moreover, regarding semiconductor substrates, since cost is directly related to the surface area of the substrate, cost can be greatly reduced by miniaturization.

It should be noted that in Embodiment 1, the transmission-side isolation via 116 is connected to the transmission-side resonant wiring 113 at a position (grounding point) one-half of the wiring length of the transmission-side resonant wiring 113 from the above-described first end of the transmission-side resonant wiring 113, but the connection position of the transmission-side isolation via 116 is not limited to this example. The transmission-side isolation via 116 may be connected to the transmission-side resonant wiring 113 in a region between a connection point of the first transmission wiring 111 to the transmission-side resonant wiring 113 and a connection point of the second transmission wiring 112 to the transmission-side resonant wiring 113.

Similarly, the reception-side isolation via 126 may be connected to the reception-side resonant wiring 123 in a region between a connection point of the first reception wiring 121 to the reception-side resonant wiring 123 and a connection point of the second reception wiring 122 to the reception-side resonant wiring 123.

It should be noted that the first end of the first transmission wiring 111 is connected to the transmission-side resonant wiring 113 at a position three-eighths of the wiring length of the transmission-side resonant wiring 113 away from a first end of the transmission-side resonant wiring 113 created by the transmission-side slit 115, but the connection point of the first transmission wiring 111 is not limited to this example. The same holds true for the second transmission wiring 112, the first reception wiring 121, and the second reception wiring 122.

Moreover, the first transmission wiring 111 and the second reception wiring 122 are not required to be arranged in a straight line. Similarly, the second transmission wiring 112 and the first reception wiring 121 are not required to be arranged in a straight line.

It should be noted that the transmission-side resonant wiring 113 is directly connected to the first transmission wiring 111 and the second transmission wiring 112, and the transmission-side resonant wiring 113 is directly connected to the transmission-side isolation via 116, but these connections may be electrical connections in the frequency band of the transmitted signals. In other words, these connections may be connections via capacitative elements. Similarly, the reception-side resonant wiring 123 may be electrically connected to the first reception wiring 121, the second reception wiring 122, and the reception-side isolation via 126 in the frequency band of the transmitted signals.

It should be noted that the transmission substrate 101 and the reception substrate 102 are made to overlap so that the contours of the transmission-side resonant wiring 113 and the reception-side resonant wiring 123 match when viewed from above, but the contours are not required to match exactly. As long as the difference is within the realm of individual differences in resonant wiring occurring upon manufacturing or substrate positional error occurring upon manufacturing, for example, the resonance coupler 10 is capable of sufficient operation.

It should be noted that the transmission substrate 101, the reception substrate 102, and the cover substrate 103 are sapphire substrates, but they may be substrates made of a dielectric material such as silicon or a semiconductor.

It should be noted that the transmission-side coplanar ground 114 may be formed only along the first transmission wiring 111 and the second transmission wiring 112. Moreover, provision of the transmission-side coplanar ground 114 is not required. Similarly, the reception-side coplanar ground 124 may be formed only along the first reception wiring 121 and the second reception wiring 122. Moreover, provision of the reception-side coplanar ground 124 is not required.

It should be noted that in Embodiment 1, a configuration in which the reception substrate 102 overlies the transmission substrate 101 was described, but the transmission-side wiring may be formed on one of top and bottom surfaces of a single substrate, and the reception-side wiring may be formed on the other of the top and bottom surfaces of the substrate.

Moreover, in Embodiment 1, the input terminals and the output terminals were differentiated from each other, but the input terminals and the output terminals are interchangeable. In other words, it is possible for a signal inputted to output terminal C to be outputted from input terminal A, for example.

It should be noted that in Embodiment 1, two input/output wirings are connected to each the transmission-side resonant wiring 113 and the reception-side resonant wiring 123, but three or more input/output wirings (input/output wiring group) may be connected to each the transmission-side resonant wiring 113 and the reception-side resonant wiring 123. In this case, grounding points are provided between connection points of the input/output wiring groups in the transmission-side resonant wiring 113 and the reception-side resonant wiring 123, and all grounding points are connected to ground wiring.

It should be noted that in Embodiment 1, a transmission ground is what indicates the reference potential of signals inputted to either input terminal A or B, but a transmission ground may be provided which is divided for each input terminal.

Figure 9:
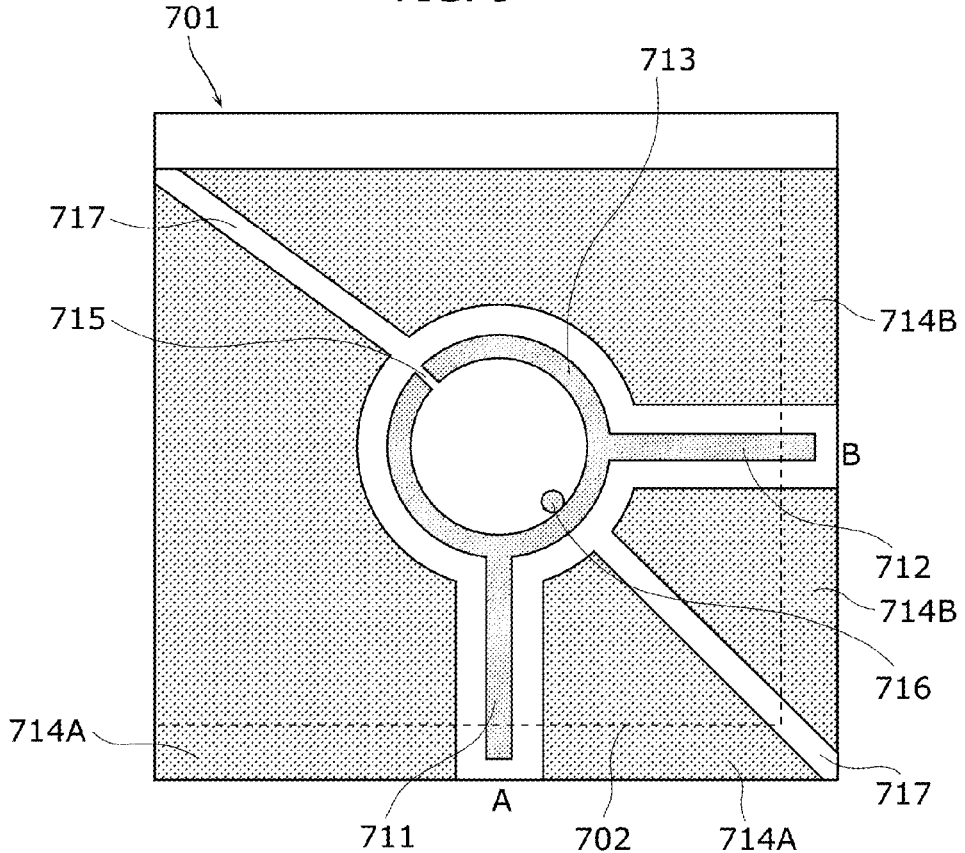
FIG. 9 is a top view of the transmission substrate provided with a ground isolation region.

FIG. 9 is a top view of a transmission substrate 701 with such a configuration.

In FIG. 9, a transmission-side coplanar ground which is a transmission ground is formed at the periphery of the transmission-side resonant wiring 713, the first transmission wiring 711, and the second transmission wiring 712. Since a metal conductor is not provided in the separation region 717, the transmission-side coplanar ground is divided in two. In other words, the transmission ground is divided into two grounds: a transmission-side coplanar ground 714A corresponding to input terminal A and a transmission-side coplanar ground 714B corresponding to input terminal B.

It should be noted that the divided transmission-side coplanar grounds 714A and 714B are not connected to the bottom surface ground provided on the bottom surface of the transmission substrate 701. Moreover, configurations on the transmission substrate 701 other than the separation region 717 (for example, the transmission-side slit 715 and the transmission-side isolation via 716) are the same as those of transmission substrate 101 shown in FIG. 5.

Although not shown in the Drawings, it should be noted that by providing a ground separation region for the reception-side coplanar ground on the reception substrate 702 as well, a configuration in which the reception ground is divided is possible.

(Embodiment 2)

In Embodiment 1, wireless signal transmission is accomplished with two paths in one resonance coupler using the transmission-side isolation via 116 and the reception-side isolation via 126, but the resonance coupler 10 may have a configuration in which vias are not used. For example, a configuration in which the transmission-side resonant wiring and the reception-side resonant wiring are connected to coplanar grounds by wiring is acceptable.

Figure 10:
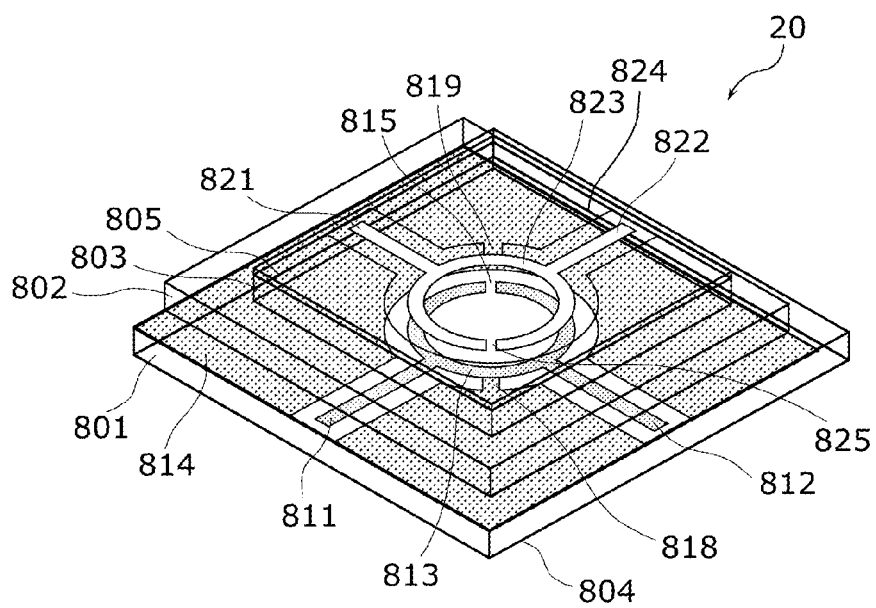
FIG. 10 is a perspective view (transparent view) of the resonance coupler according to Embodiment 2.
Figure 11:
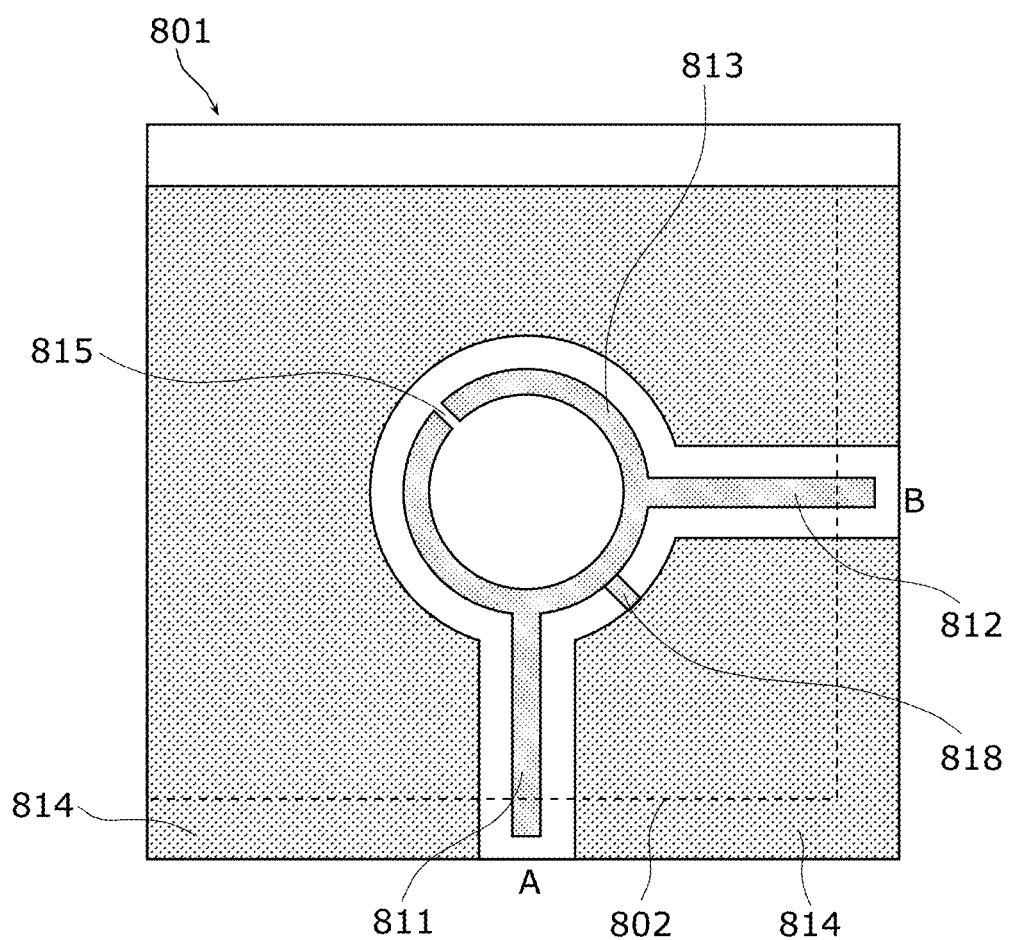
FIG. 11 is a top view of the transmission substrate of the resonance coupler according to Embodiment 2.

FIG. 10 is a perspective view of a resonance coupler 20 in which the resonant wiring is connected to coplanar grounds with wiring. Moreover, FIG. 11 is a top view of a transmission substrate 801 of the resonance coupler 20 having this configuration.

It should be noted that the structure of the reception substrate 802 is the same as the structure of the transmission substrate 801, and as such, the reception substrate 802 is omitted from the Drawings. Moreover, in the following description of Embodiment 2, some details, especially those regarding structural elements, configurations, and operations, for example, not discussed, are the same as those in Embodiment 1.

The resonance coupler 20 according to Embodiment 2 includes the transmission substrate 801, the reception substrate 802 provided above the transmission substrate 801, and a cover substrate 803 provided above the reception substrate 802.

first transmission wiring 811 made of metal, second transmission wiring 812 made of metal, and a transmission-side resonant wiring 813 made of metal and having a circular shape opened by a transmission-side slit 815 are formed on the top surface of the transmission substrate 801. Moreover, a transmission-side coplanar ground 814, which is a metal conductor, is formed at a periphery of the first transmission wiring 811, the second transmission wiring 812, and the transmission-side resonant wiring 813. A bottom surface ground 804 is formed on the bottom surface of the transmission substrate 801.

The reception substrate 802 overlies the transmission substrate 801. First reception wiring 821 made of metal, second reception wiring 822 made of metal, and reception-side resonant wiring 823 made of metal and having a circular shape opened by a reception-side slit 825 are formed on the top surface of the reception substrate 802. Moreover, a reception-side coplanar ground 824, which is a metal conductor, is formed at a periphery of the first reception wiring 821, the second reception wiring 822, and the reception-side resonant wiring 823.

The cover substrate 803 overlies the reception substrate 802. Moreover, a cover ground 805, which is a metal conductor, is formed on the top surface of the cover substrate 803.

More specifically, a first end of transmission-side isolation wiring 818 is connected to the transmission-side resonant wiring 813 at a position one half of the wiring length of the transmission-side resonant wiring 813 away from a first end of the transmission-side resonant wiring 813. The second end of the transmission-side isolation wiring 818 is connected to the transmission-side coplanar ground 814. The transmission-side coplanar ground 814 is a transmission ground which indicates the reference potential of signals inputted to the transmission substrate 801.

A first end of reception-side isolation wiring 819 is connected to the reception-side resonant wiring 823 at a position one half of the wiring length of the reception-side resonant wiring 823 away from a first end of the reception-side resonant wiring 823. The second end of the reception-side isolation wiring 819 is connected to the reception-side coplanar ground 824. The reception-side coplanar ground 824 is a reception ground which indicates the reference potential of signals inputted to the reception substrate 802.

The material used for the transmission-side isolation wiring 818 and the reception-side isolation wiring 819 is, for example, gold, but may be a different metal. The wiring width the transmission-side isolation wiring 818 and the reception-side isolation wiring 819 is, for example, 0.1 mm.

With this, since the transmission characteristics according to Embodiment 1 shown in FIG. 7 and FIG. 8 are realized, wireless signal transmission is realized with two paths in one resonance coupler. In other words, by using the resonance coupler 20, miniaturization and high density integration of the wireless signal transmission apparatus is possible.

It should be noted that in Embodiment 2, the cover ground 805 and the bottom surface ground 804 are not required to be formed. As described above, this is because the transmission-side coplanar ground 814 is a transmission ground which indicates the reference potential of signals inputted to the transmission substrate 801 functions as the transmission ground, and the reception-side coplanar ground functions as the reception ground. As such, in this case, a configuration in which the cover substrate 803 is not used is possible.

Moreover, as described above, when the cover ground 805 and the bottom surface ground 804 are not formed, the first transmission wiring 811, the second transmission wiring 812, the first reception wiring 821, and the second reception wiring 822 become coplanar wiring structures.

In this way, grounding resonant wiring with wiring on the same plane eliminates the need to provide a via, which allows for the manufacturing process of the resonance coupler 10 to be simplified. Moreover, since a configuration in which a cover substrate is not required is possible, reduction in size of the resonance coupler 20 in the substrate thickness direction is possible.

(Embodiment 3)

In Embodiment 1, the transmission-side isolation via 116 and the transmission-side resonant wiring 113 are directly connected and the reception-side isolation via 126 and the reception-side resonant wiring 123 are directly connected, but the reception-side resonant wiring and the transmission-side resonant wiring may be connected to isolated vias with wiring.

Figure 12:
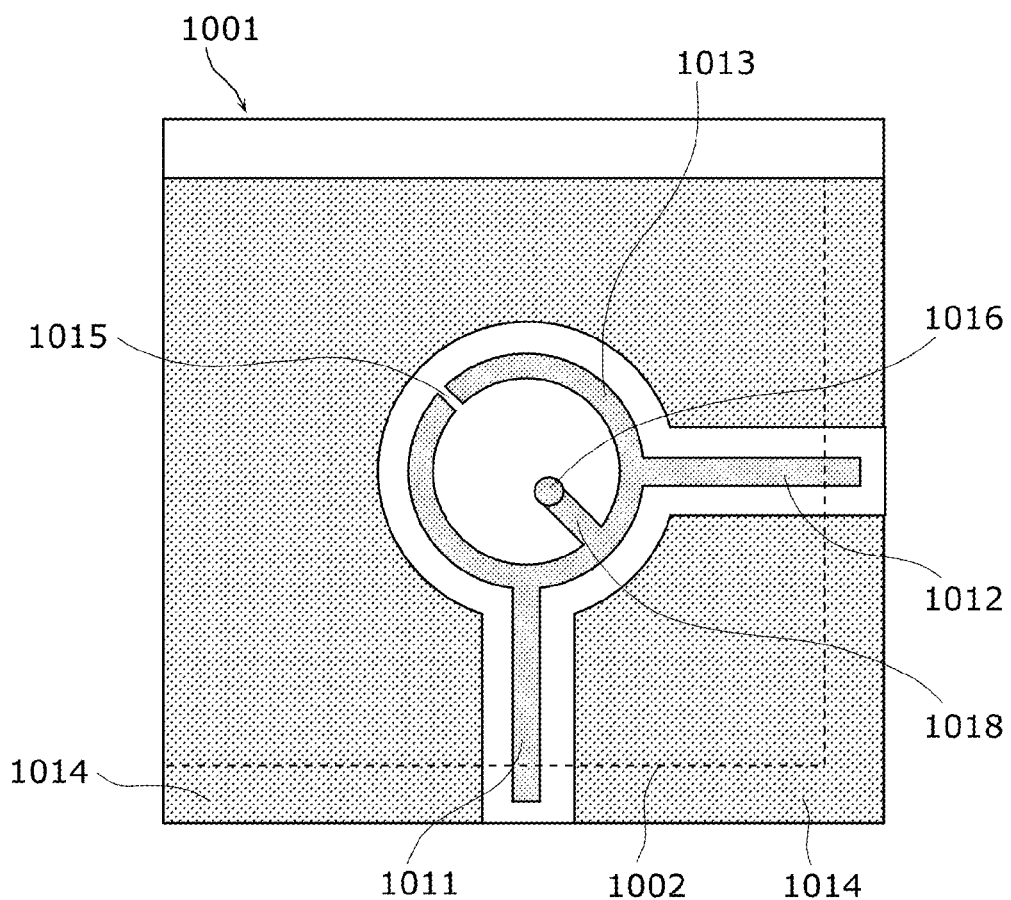
FIG. 12 is a top view of the transmission substrate of the resonance coupler according to Embodiment 3.

FIG. 12 is a top view of a transmission substrate 1001 with such a configuration. It should be noted that, in the following description of Embodiment 3, some details, especially those regarding structural elements, configurations, and operations, for example, not discussed, are the same as those in Embodiment 1.

Transmission-side resonant wiring 1013, first transmission wiring 1011, and second transmission wiring 1012 are formed on the transmission substrate 1001. The transmission-side resonant wiring 1013 is connected to the first transmission wiring 1011 and the second transmission wiring 1012, and a transmission-side coplanar ground 1014 is formed at a periphery of the first transmission wiring 1011, the second transmission wiring 1012, and the transmission-side resonant wiring 1013.

The transmission-side resonant wiring 1013 has a circular shape that is opened by a transmission-side slit 1015, and is connected to a transmission-side isolation via 1016 by connecting wiring 1018.

The transmission-side isolation via 1016 is connected to a bottom surface ground formed on the bottom surface of the transmission substrate 1001. The bottom surface ground is a transmission ground which indicates the reference potential of signals inputted to the transmission substrate 1101. As such, the transmission-side resonant wiring 1013 is connected to the transmission ground at a connection point (grounding point) connected to the connecting wiring 1018.

It should be noted that, as the dotted line in FIG. 12 shows, a reception substrate 1002 overlies the top surface of transmission substrate 1001. It should be noted that the structure of the reception substrate 1002 is the same as the structure of the transmission substrate 1001, and as such, the reception substrate 1002 is omitted from the Drawings.

With this, since the transmission characteristics according to Embodiment 1 shown in FIG. 7 and FIG. 8 are realized with the configuration described in Embodiment 3 as well, wireless signal transmission is realized with two paths in one resonance coupler. In other words, by using the resonance coupler, miniaturization and high density integration of the wireless signal transmission apparatus is possible.

Moreover, it is possible to fine tune the transmission characteristics of the resonance coupler by changing the wiring length of the connecting wiring 1018.

(Embodiment 4)

In Embodiments 1 through 3, the transmission-side resonant wiring 113 and the reception-side resonant wiring 123 have a circular shape with a diameter of 1 mm, but the resonant wiring may have a rectangular or other shape.

Figure 13:
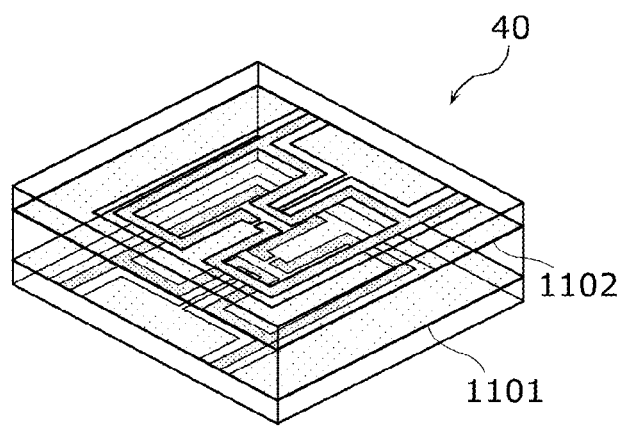
FIG. 13 is a schematic view (transparent view) of the resonance coupler according to Embodiment 4.

FIG. 13 is a schematic view of a resonance coupler 40 which uses resonant wiring according to Embodiment 4. Even with resonant wiring having a shape having at least five bends, like is shown in FIG. 13, the resonance coupler 40 operates the same as in Embodiment 1 since a reception substrate 1102 overlies the transmission substrate 1101 like is shown in FIG. 3.

Figure 14:
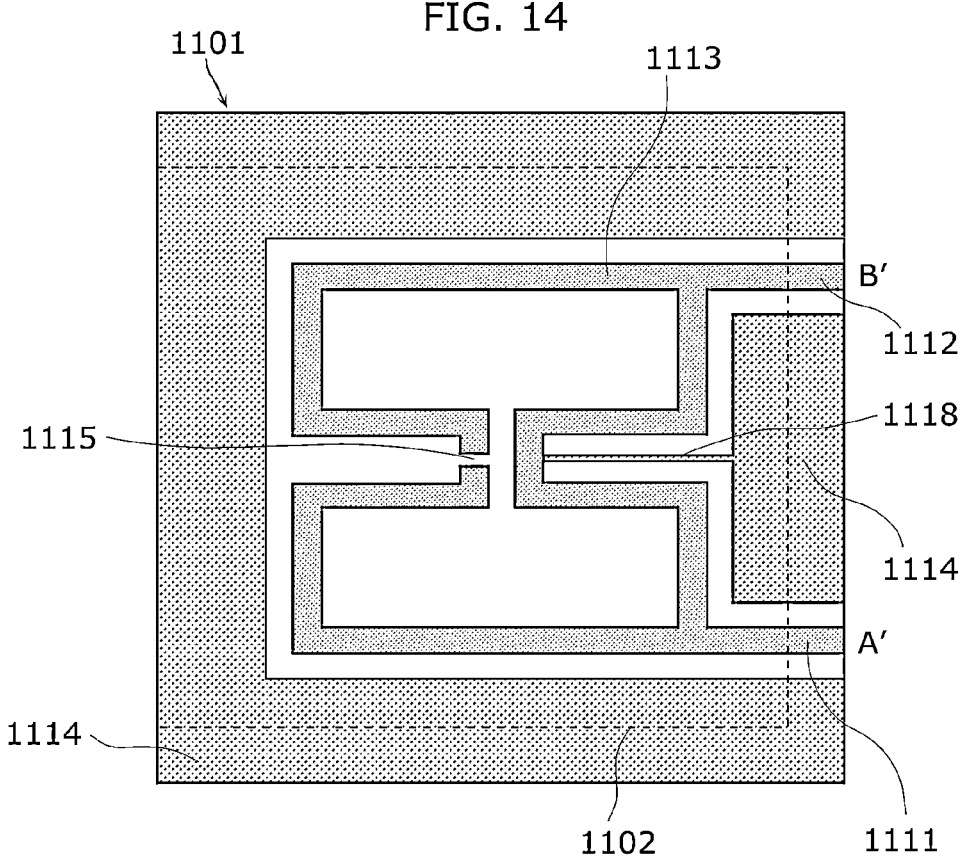
FIG. 14 is a top view of the transmission substrate of the resonance coupler according to Embodiment 4.

FIG. 14 is a top view of a transmission substrate 1101 according to Embodiment 4.

Transmission-side resonant wiring 1113 has a loop shape having at a total of twelve bends. A portion of the transmission-side resonant wiring 1113 is opened by a transmission-side slit 1115. The wiring width of the transmission-side resonant wiring 1113 is, for example, 0.1 mm.

A first end of first transmission wiring 1111 is connected to the transmission-side resonant wiring 1113 at a position three-eighths of the wiring length of the transmission-side resonant wiring 1113 away from a first end of the transmission-side resonant wiring 1113 created by the transmission-side slit 1115. Moreover, a first end of second transmission wiring 1112 is connected to the transmission-side resonant wiring 1113 at a position five-eighths of the wiring length of the transmission-side resonant wiring 1113 away from the above-described first end of the transmission-side resonant wiring 1113 created by the transmission-side slit 1115.

The second end of the first transmission wiring 1111 not connected to the transmission-side resonant wiring 1113 is an input terminal A', and the second end of the second transmission wiring 1112 not connected to the transmission-side resonant wiring 1113 is an input terminal B'. The wiring width of the first transmission wiring 1111 and the second transmission wiring 1112 alike is 0.1 mm.

A transmission-side coplanar ground 1114 is formed at a periphery of the first transmission wiring 1111, the second transmission wiring 1112, and the transmission-side resonant wiring 1113.

A first end of transmission-side isolation wiring 1118 is connected to the transmission-side resonant wiring 1113 at a position one half of the wiring length of the transmission-side resonant wiring 1113 away from the first end of the transmission-side resonant wiring 1113. The second end of the transmission-side isolation wiring 1118 is connected to the transmission-side coplanar ground 1114. The transmission-side coplanar ground 1114 is a transmission ground which indicates the reference potential of signals inputted to the transmission substrate 1101.

Moreover, as the dotted line in FIG. 14 shows, a reception substrate 1102 overlies the top surface of transmission substrate 1101. Although not shown in the Drawings, it should be noted that a bottom surface ground is formed on a bottom surface of the transmission substrate 1101.

Figure 15:
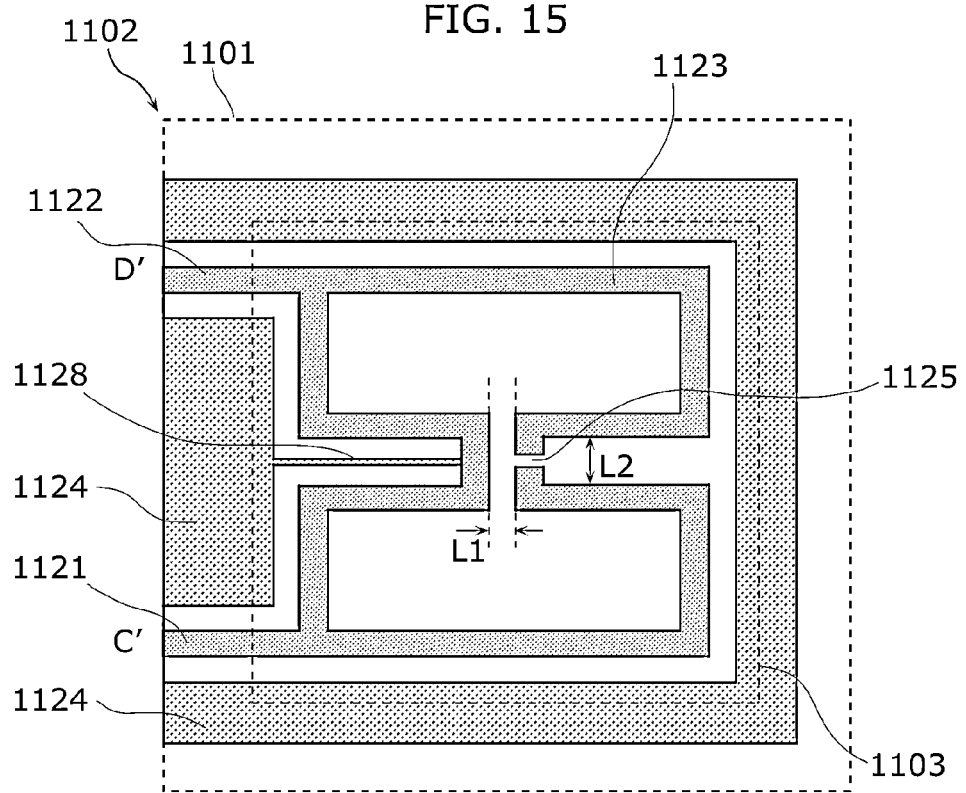
FIG. 15 is a top view of the reception substrate of the resonance coupler according to Embodiment 4.

FIG. 15 is a top view of the reception substrate 1102 according to Embodiment 4.

Reception-side resonant wiring 1123 has the same shape as the transmission-side resonant wiring 1113.

A first end of first reception wiring 1121 is connected to the reception-side resonant wiring 1123 at a position three-eighths of the wiring length of the reception-side resonant wiring 1123 away from a first end of the reception-side resonant wiring 1123 created by a reception-side slit 1125. Moreover, a first end of second reception wiring 1122 is connected to the reception-side resonant wiring 1123 at a position five-eighths of the wiring length of the reception-side resonant wiring 1123 away from the above-described first end of the reception-side resonant wiring 1123 created by a reception-side slit 1125.

The second end the first reception wiring 1121 not connected to the reception-side resonant wiring 1123 is an output terminal C', and the second end of the second reception wiring 1122 not connected to the reception-side resonant wiring 1123 is an output terminal D'. The wiring width of the first reception wiring 1121 and the second reception wiring 1122 alike is, for example, 0.1 mm.

A reception-side coplanar ground 1124 is formed at a periphery of the first reception wiring 1121, the second reception wiring 1122, and the reception-side resonant wiring 1123.

A first end of reception-side isolation wiring 1128 is connected to the reception-side resonant wiring 1123 at a position one half of the wiring length of the reception-side resonant wiring 1123 away from the first end of the reception-side resonant wiring 1123. The second end of the reception-side isolation wiring 1128 is connected to the reception-side coplanar ground 1124. The reception-side coplanar ground 1124 is a reception ground which indicates the reference potential of signals inputted to the reception substrate 1102.

Moreover, as the dotted line in FIG. 15 shows, a cover substrate 1103 overlies the top surface of reception substrate 1102. Although not shown in the Drawings, it should be noted that a cover ground is formed on the top surface of the cover substrate 1103.

As FIG. 13 shows, the transmission substrate 1101 and the reception substrate 1102 overlap so that when viewed from above, the transmission-side resonant wiring 1113 and the reception-side resonant wiring 1123 have matching contours. Additionally, the transmission substrate 1101 and the reception substrate 1102 overlap so that the transmission-side resonant wiring 1113 and the reception-side resonant wiring 1123 are symmetrical about a point.

The resonance coupler 40 according to Embodiment 4 has the same transmission characteristics as the resonance coupler 10 according to Embodiment 1. In other words, the transmission characteristics of the resonance coupler 10 according to Embodiment 4 are the same as those shown in FIG. 7 and FIG. 8 if input terminals A and B were to be replaced with input terminals A' and B' and output terminals C and D were to be replaced with output terminals C' and D'.

As long as the wiring length of the resonant wiring of the resonance coupler 10 and the resonant wiring of the resonance coupler 40 are the is the same, the resonant wiring of the resonance coupler 40 takes up less area on the substrate. This is because the resonant wiring of the resonance coupler 40 has multiple bends. As such, the resonance coupler 40 can be miniaturized to a greater extant than the resonance coupler 10c can.

It should be noted that with the transmission substrate 1101, the transmission-side resonant wiring 1113 is connected to the transmission-side coplanar ground 1114 with the transmission-side isolation wiring 1118, but the transmission-side resonant wiring 1113 may be connected to the bottom surface ground with a via.

Figure 16:
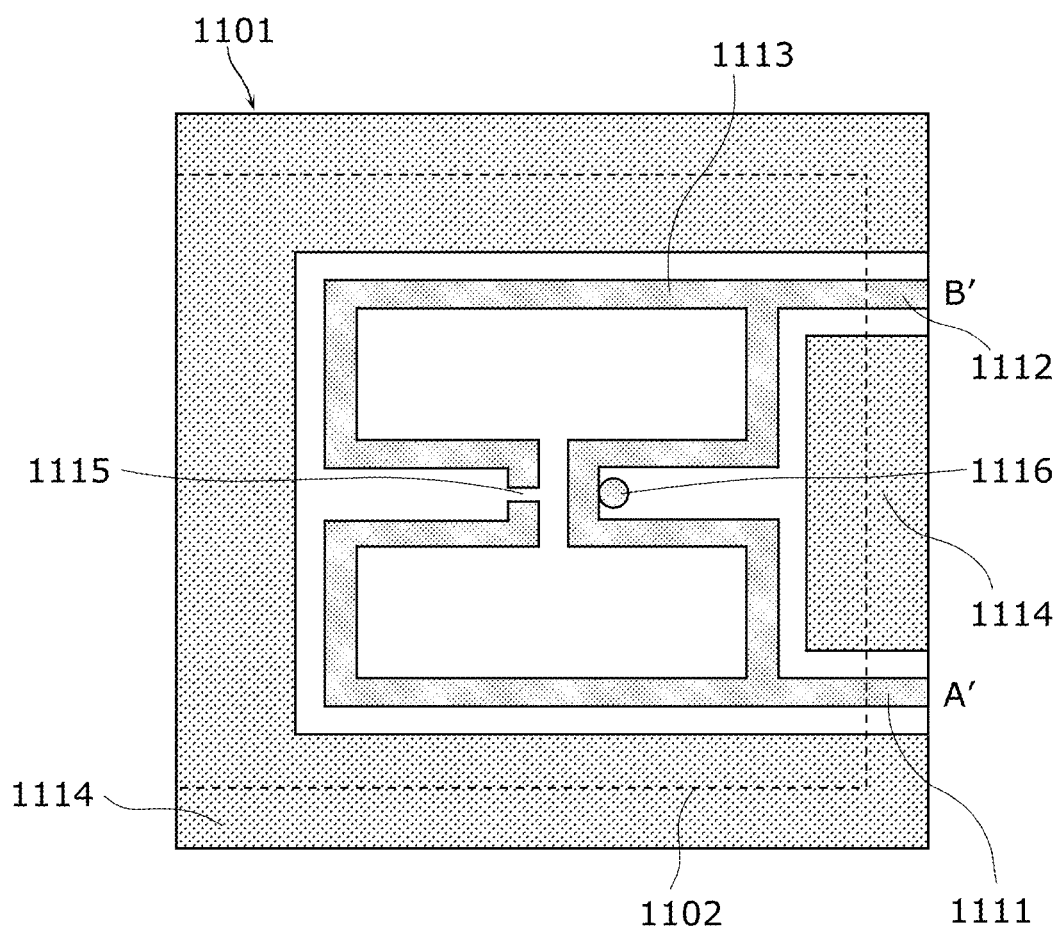
FIG. 16 is a top view of a transmission substrate having the resonant wiring connected to a ground with a via.

FIG. 16 shows a variation of the transmission substrate having the transmission-side resonant wiring according to Embodiment 4 connected to a ground with a via.

A transmission-side isolation via 1116 is connected to the transmission-side resonant wiring 1113 at a position (grounding point) one half of the wiring length of the transmission-side resonant wiring 1113 away from the first end of the transmission-side resonant wiring 1113. The transmission-side isolation via 1116 is provided on the inside of the loop shape of the transmission-side resonant wiring 1113.

Although not shown in the Drawings, it should be noted that it is possible to configure the reception substrate 1102 to have the same configuration as the transmission substrate 1101. In other words, the reception-side resonant wiring 1123 of the reception substrate 1102 may be connected to a cover ground with a via.

Although not shown in the Drawings, it should be noted that a configuration in which the resonant wiring is connected to the via with wiring, as is the case in Embodiment 3, is also possible.

It should be noted that in the above-described Embodiment 4, the shape of the reception-side resonant wiring 1123 on the reception substrate 1102 which overlies the top surface of the transmission substrate 1101 is described as having the same shape as the transmission-side resonant wiring 1113, but the shapes are not required to match exactly.

For example, it is possible to adjust the frequency band of transmitted signals (change the transmission characteristics shown in FIG. 7 and FIG. 8) by slightly changing the shape (specifications) of the reception-side resonant wiring 1123 on the overlying reception substrate 1102, with respect to the transmission substrate 1101.

More specifically, the length L1 of the gap between the grounding point of the reception-side resonant wiring 1123 and the reception-side slit shown in FIG. 15 and the length L2 shown in FIG. 15 are made to be different lengths than the corresponding lengths on the transmission-side resonant wiring 1113. This makes it possible to adjust the frequency band of the transmitted signals. In this case, the shape of the transmission-side resonant wiring 1113 and the shape of the reception-side resonant wiring 1123 are slightly different, but it has been confirmed that this causes absolutely no problem with regard to the operation of the resonance coupler.

In this way, by using rectangular loop shaped resonant wiring having a plurality of bends, such as is the case in Embodiment 4, it is possible to reduce the amount of surface area taken up by the resonant wiring on the substrate. As such, by using the resonance coupler 40 according to Embodiment 4, miniaturization and high integration of the wireless transmission apparatus to a further extent is possible.

Hereinbefore the resonance coupler based on the first through fourth non-limiting and exemplary embodiments has been described. Isolation and wireless transmission of two high frequency signals with one resonance coupler is achievable by implementing the resonance coupler according to one or more exemplary embodiments or features disclosed herein.

As such, in a wireless transmission apparatus which uses a plurality of resonance couplers, miniaturization and high integration of the apparatus is possible since the number of resonance couplers used decreases.

The herein disclosed subject matter is to be considered descriptive and illustrative only, and the appended Claims are of a scope intended to cover and encompass not only the particular embodiment(s) disclosed, but also equivalent structures, methods, and/or uses.

INDUSTRIAL APPLICABILITY

The resonance coupler according to one non-limiting and exemplary embodiment disclosed herein is capable of isolating and transmitting two signals with one resonance coupler, and is applicable to wireless transmission apparatuses used for driving gates of inverter systems or matrix converter systems.

The invention claimed is:

1. A resonance coupler for wireless transmission of a transmission signal, the resonance coupler comprising:
   a first planar region;
   a second planar region facing the first planar region;
   a first transmission line; and
   a second transmission line,
   wherein the first transmission line includes:
   first resonant wiring;
   first input wiring connected to the first resonant wiring; and
   second input wiring connected to the first resonant wiring,
   the first input wiring and the second input wiring are wiring to which the transmission signal is inputted,
   the second transmission line includes:
   second resonant wiring;
   first output wiring connected to the second resonant wiring; and
   second output wiring connected to the second resonant wiring,
   the first output wiring and the second output wiring are wiring from which the transmission signal is outputted,
   a first grounding point on the first resonant wiring is connected to first ground wiring indicating a reference potential of the transmission signal in the first transmission line,
   the first grounding point is positioned between a connection point of the first input wiring to the first resonant wiring and a connection point of the second input wiring to the first resonant wiring,
   a second grounding point on the second resonant wiring is connected to second ground wiring indicating a reference potential of the transmission signal in the second transmission line,
   the second grounding point is positioned between a connection point of the first output wiring to the second resonant wiring and a connection point of the second output wiring to the second resonant wiring,
   the first resonant wiring has an open loop shape having a first opening, and
   the second resonant wiring has an open loop shape having a second opening.

2. The resonance coupler according to claim 1,
   wherein the connection point of the first resonant wiring and the first input wiring or the connection point of the first resonant wiring and the second input wiring is positioned closer to the first grounding point than to a first end of the first resonant wiring formed by the first opening, and
   the connection point of the second resonant wiring and the first output wiring or the connection point of the second resonant wiring and the second output wiring is positioned closer to the second grounding point than to a first end of the second resonant wiring formed by the second opening.

3. The resonance coupler according to claim 1,
   wherein the first input wiring is connected to the first resonant wiring at a position three-eighths of a wiring length of the first resonant wiring away from a first end of the first resonant wiring formed by the first opening,
   the second input wiring is connected to the first resonant wiring at a position five-eighths of the wiring length of the first resonant wiring away from the first end of the first resonant wiring formed by the first opening,
   the first output wiring is connected to the second resonant wiring at a position three-eighths of a wiring length of the second resonant wiring away from a first end of the second resonant wiring formed by the second opening, and
   the second output wiring is connected to the second resonant wiring at a position five-eighths of the wiring length of the second resonant wiring away from the first end of the second resonant wiring formed by the second opening.

4. The resonance coupler according to claim 1,
   wherein a distance L1 from a first end of the first resonant wiring formed by the first opening to the first grounding point and a distance L2 from a first end of the second resonant wiring formed by the second opening to the second grounding point are equal.

5. The resonance coupler according to claim 1,
   wherein a distance L1 from a first end of the first resonant wiring formed by the first opening to the first grounding point is equal to one half of a wiring length of the first resonant wiring, and
   a distance L2 from a first end of the second resonant wiring formed by the second opening to the second grounding point is equal to one half of a wiring length of the second resonant wiring.

6. The resonance coupler according to claim 1,
   wherein the first ground wiring is positioned to a side of the first planar region opposite to a side on which the second planar region is located, and
   the first grounding point is connected to the first ground wiring by a first via hole.

7. The resonance coupler according to claim 1,
   wherein the first ground wiring is provided on the first planar region.

8. The resonance coupler according to claim 1,
   wherein the second ground wiring is positioned to a side of the second planar region opposite to a side on which the first planar region is located, and
   the second grounding point is connected to the second ground wiring by a second via hole.

9. The resonance coupler according to claim 1,
   wherein the second ground wiring is provided on the second planar region.

10. The resonance coupler according to claim 1,
    wherein the first resonant wiring and the second resonant wiring are provided facing each other, and when viewed in a direction perpendicular to a main surface of the first planar region, have matching contours and are symmetric about a point.

11. The resonance coupler according to claim 1,
    wherein the first transmission line and the second transmission line are provided facing each other and spaced apart by a distance of at most a half wavelength of the transmission signal, the distance being measured in a direction perpendicular to the first planar region and measured between the first resonant wiring and the second resonant wiring.

12. A resonance coupler for wireless transmission of a transmission signal, the resonance coupler comprising:
a first planar region;
a second planar region facing the first planar region;
a first transmission line; and
a second transmission line,
wherein the first transmission line includes:
first resonant wiring;
first input wiring connected to the first resonant wiring; and
second input wiring connected to the first resonant wiring,
the first input wiring and the second input wiring are wiring to which the transmission signal is inputted,
the second transmission line includes:
second resonant wiring;
first output wiring connected to the second resonant wiring; and
second output wiring connected to the second resonant wiring,
the first output wiring and the second output wiring are wiring from which the transmission signal is outputted,
a first grounding point on the first resonant wiring is connected to first ground wiring indicating a reference potential of the transmission signal in the first transmission line,
the first grounding point is positioned between a connection point of the first input wiring to the first resonant wiring and a connection point of the second input wiring to the first resonant wiring,
a second grounding point on the second resonant wiring is connected to second ground wiring indicating a reference potential of the transmission signal in the second transmission line,
the second grounding point is positioned between a connection point of the first output wiring to the second resonant wiring and a connection point of the second output wiring to the second resonant wiring,
the first ground wiring is positioned to a side of the first planar region opposite to a side on which the second planar region is located, and
the first grounding point is connected to the first ground wiring by a first via hole.

13. A resonance coupler for wireless transmission of a transmission signal, the resonance coupler comprising:
a first planar region;
a second planar region facing the first planar region;
a first transmission line; and
a second transmission line,
wherein the first transmission line includes:
first resonant wiring;
first input wiring connected to the first resonant wiring; and
second input wiring connected to the first resonant wiring,
the first input wiring and the second input wiring are wiring to which the transmission signal is inputted,
the second transmission line includes:
second resonant wiring;
first output wiring connected to the second resonant wiring; and
second output wiring connected to the second resonant wiring,
the first output wiring and the second output wiring are wiring from which the transmission signal is outputted,
a first grounding point on the first resonant wiring is connected to first ground wiring indicating a reference potential of the transmission signal in the first transmission line,
the first grounding point is positioned between a connection point of the first input wiring to the first resonant wiring and a connection point of the second input wiring to the first resonant wiring,
a second grounding point on the second resonant wiring is connected to second ground wiring indicating a reference potential of the transmission signal in the second transmission line,
the second grounding point is positioned between a connection point of the first output wiring to the second resonant wiring and a connection point of the second output wiring to the second resonant wiring,
the second ground wiring is positioned to a side of the second planar region opposite to a side on which the first planar region is located, and
the second grounding point is connected to the second ground wiring by a second via hole.

* * * * *